(12) United States Patent
Higashi et al.

(10) Patent No.: US 8,828,548 B2
(45) Date of Patent: Sep. 9, 2014

(54) INTERLAYER ADHESIVE, WATERPROOF STRUCTURE AND WATERPROOF CONSTRUCTION METHOD

(71) Applicant: Dyflex Corporation, Shinjuku-ku (JP)

(72) Inventors: Katsuhiro Higashi, Funabashi (JP); Noriyoshi Yano, Funabashi (JP)

(73) Assignee: Dyflex Corporation, Tokyo (JP)

( * ) Notice: Subject to any disclaimer, the term of this patent is extended or adjusted under 35 U.S.C. 154(b) by 0 days.

(21) Appl. No.: 13/731,421

(22) Filed: Dec. 31, 2012

(65) Prior Publication Data

US 2013/0115464 A1    May 9, 2013

Related U.S. Application Data

(63) Continuation of application No. PCT/JP2011/064917, filed on Jun. 29, 2011.

(30) Foreign Application Priority Data

Jun. 30, 2010 (JP) ................................. 2010-149117

(51) Int. Cl.
*B32B 27/40* (2006.01)
*B29C 65/48* (2006.01)

(52) U.S. Cl.
USPC ..................... 428/423.1; 427/207.1; 156/278

(58) Field of Classification Search
USPC ..................... 428/423.1; 427/207.1; 156/278
See application file for complete search history.

(56) References Cited

U.S. PATENT DOCUMENTS

| 6,992,138 | B2 * | 1/2006 | Tsuji et al. ..................... 525/131 |
| 7,718,263 | B2 * | 5/2010 | Takada et al. ................. 428/414 |
| 2002/0122920 | A1 * | 9/2002 | Chikami ........................ 428/195 |
| 2006/0194004 | A1 * | 8/2006 | Niemoller et al. .......... 428/32.11 |

FOREIGN PATENT DOCUMENTS

| EP | 1 788 050 A1 | 5/2007 |
| JP | 02178382 A * | 7/1990 |
| JP | 2000-263995 A | 9/2000 |
| JP | 2001-200548 A | 7/2001 |
| JP | 2001-1200548 A | 7/2001 |
| JP | 2002-348896 A | 12/2002 |
| JP | 2002-364297 A | 12/2002 |
| JP | 2003-049445 A | 2/2003 |

(Continued)

OTHER PUBLICATIONS

International Search Report (PCT/ISA/210) issued on Aug. 23, 2011, by the Japanese Patent Office as the International Searching Authority for International Application No. PCT/JP2011/004917.
English translation of the International Preliminary Report on Patentability, and the Written Opinion, issued on Mar. 4, 2013, by the Japanese Patent Office as the International Searching Authority for International Application No. PCT/JP2011/064917.

(Continued)

*Primary Examiner* — Thao T. Tran
(74) *Attorney, Agent, or Firm* — Buchanan Ingersoll & Rooney PC

(57) ABSTRACT

An interlayer adhesive which is interposed between a waterproof layer formed from a resin-coated film and an inorganic material layer using mortar or concrete to adhere the waterproof layer and the inorganic material layer to each other, the interlayer adhesive containing a resin composition obtained by reacting (a) a base resin including an emulsion of a main resin containing at least one of an acrylic-based resin, an ethylene-vinyl acetate-based resin, and an epoxy-based resin, with (b) an isocyanate compound having an isocyanate group.

15 Claims, 6 Drawing Sheets

(56) References Cited

FOREIGN PATENT DOCUMENTS

| | | | |
|---|---|---|---|
| JP | 2003073611 A | * | 3/2003 |
| JP | 2007-091999 A | | 4/2007 |
| WO | WO 2011086555 A1 | * | 7/2011 ............. C08G 18/08 |

OTHER PUBLICATIONS

European Search Report issued on Jan. 24, 2014, by the European Patent Office in corresponding EP Application No. 11800899.4.

* cited by examiner

INTERLAYER ADHESIVE, WATERPROOF STRUCTURE AND WATERPROOF CONSTRUCTION METHOD

RELATED APPLICATIONS

This application claims priority as a continuation application under 35 U.S.C. §120 to PCT/JP2011/064917, which was filed as an International Application on Jun. 29, 2011 designating the U.S., and which claims priority to Japanese Application No. 2010-149117 filed in Japan on Jun. 30, 2010. The entire contents of these applications are hereby incorporated by reference in their entireties.

FIELD

Disclosed is an interlayer adhesive, which is applied between a waterproof layer including a resin-coated film and an inorganic material layer including mortar or concrete and which is cast on the waterproof layer and adheres the waterproof layer and the inorganic material layer to each other, and to a waterproof structure and a waterproof construction method.

BACKGROUND INFORMATION

A structure which has a waterproof layer made of a polyurethane-based resin, a polyurethane based resin, Fiber Reinforced Plastics (hereinafter, refer to FRP) or the like, and an inorganic material layer which is made of mortar, concrete or the like and is cast on the waterproof layer, has been provided in an underground street, a subway station, an underground garage, an underground city or the like, or roofs of such subsurface structures.

Such a structure is made by forming a waterproof layer made of a polyurethane based resin or the like and forming an inorganic material layer on the waterproof layer.

When the inorganic material was cast on the waterproof layer, a rubber asphalt sheet was adhered thereto or a resin mortar or an appropriate primer was applied to the waterproof layer, in order to improve adhesion strength between the waterproof layer and the inorganic material layer (see Japanese Unexamined Patent Application, First Publication No. 2002-364297).

SUMMARY

However, the waterproof layer and the inorganic material layer have largely different properties, and thus it cannot be said that they have sufficient adhesion force to each other. Reliable prevention of peeling of the inorganic material layer from the waterproof layer can be desirable.

Further, when the inorganic material layer peels away from the waterproof layer, subsurface water, rain water or the like enters between the waterproof layer and the inorganic material layer, and hence there is a concern that this may cause an internal water leak in the structure or deterioration of the structure itself.

According to an exemplary aspect, disclosed is an interlayer adhesive where the waterproof layer and the inorganic material layer can be firmly adhered, and problems of water leakage or the like can be suppressed over the long term. According to an exemplary aspect, disclosed is a waterproof structure and a waterproof construction method.

According to an exemplary aspect, disclosed is an interlayer adhesive which is interposed between a waterproof layer formed from a resin-coated film and an inorganic material layer formed from a mortar or concrete, wherein the interlayer adhesive is suitable for adhering the waterproof layer and the inorganic material layer to each other, the interlayer adhesive comprising: a resin composition obtained by reacting (a) a base resin including an emulsion of a main resin containing at least one of an acrylic-based resin, an ethylene-vinyl acetate-based resin, and an epoxy-based resin, with (b) an isocyanate compound having an isocyanate group.

According to an exemplary aspect, disclosed is a waterproof construction method, comprising: forming a waterproof layer formed from a resin-coated film on a surface of a substrate; forming an interlayer adhesive layer by coating and curing an exemplary interlayer adhesive on the surface of the waterproof layer formed in the waterproof layer-forming step; and forming an inorganic material layer by using a slurry material containing mortar or concrete on the surface of the interlayer adhesive layer formed in the interlayer adhesive layer-forming step.

According to an exemplary aspect, disclosed is a multi-layer waterproof structure comprising: a waterproof layer which is formed on a surface of a substrate, wherein the waterproof layer is formed from a resin-coated film, an inorganic material layer formed from a mortar or concrete, and an interlayer adhesive layer which is interposed between the waterproof layer and the inorganic material layer to adhere the waterproof layer and the inorganic material layer to each other, wherein the interlayer adhesive layer contains a curing material of an exemplary interlayer adhesive.

According to an exemplary aspect, an interlayer adhesive is interposed between a waterproof layer formed from a resin-coated film and an inorganic material layer using mortar or concrete to adhere the waterproof layer and the inorganic material layer to each other, and the interlayer adhesive contains a resin composition obtained by reacting (a) a base resin including an emulsion of a main resin containing at least one of an acrylic-based resin, an ethylene-vinyl acetate-based resin, and an epoxy-based resin, with (b) an isocyanate compound having an isocyanate group.

The main resin can contain at least one of acrylic-based resins having a functional group having active hydrogen in a molecule.

The main resin may contain at least one acrylic-based resin having a Tg (glass transition temperature) of −60 to −10° C.

The base resin can be an oil-in-water emulsion using an acrylic-based resin as the main resin.

The isocyanate compound can be a water-dispersible or a water soluble polyisocyanate compound.

The water-dispersible or water soluble polyisocyanate compound can include at least one of an HDI trimer, a burette modified body, an allophanate modified body or an adduct modified body.

The interlayer adhesive, where the main resin can be an acrylic-based resin, may contain a liquid resin composition obtained by mixing just before use a base resin containing 100 parts by mass of an acrylic-based resin in a solid content and 0.05 to 20 parts by mass of an isocyanate compound in a solid content.

The interlayer adhesive, where the main resin is an acrylic-based resin, may contain a liquid resin composition obtained by mixing and reacting, in advance, a base resin containing 100 parts by mass of an acrylic-based resin in a solid content and 0.05 to 5 parts by mass of an isocyanate compound in a solid content.

The resin-coated film can contain a thermosetting resin or a thermoplastic resin.

The resin-coated film can contain at least one of a polyurethane-based resin, a polyurea-based resin, an acryl urethane-based resin, a polyvinyl chloride-based resin, a polyvinylidene chloride-based resin, an acryl-based resin, and a fiber reinforced plastic.

According to an exemplary aspect, the waterproof construction method includes: a step of forming a waterproof layer formed from a resin-coated film on the surface of the substrate, a step of forming an interlayer adhesive layer by applying and curing the interlayer adhesive on the surface of the waterproof layer formed in the waterproof layer-forming step, and a step of forming an inorganic material layer by using a slurry material containing mortar or concrete on the surface of the interlayer adhesive layer formed in the adhesive layer-forming step.

The waterproof layer-forming step can include a step of laying a flexible sheet along the surface of the substrate and a step of forming the waterproof layer containing the resin-coated film by applying and curing a liquid resin material to and on the flexible sheet.

The interlayer adhesive, where the main resin can be an acrylic-based resin, can be used and the interlayer adhesive can contain a liquid resin composition obtained by mixing just before use a base resin containing 100 parts by mass of an acrylic-based resin in a solid content and 0.05 to 20 parts by mass of an isocyanate compound in a solid content.

The interlayer adhesive, where the main resin can be an acrylic-based resin, can be used and the interlayer adhesive can contain a liquid resin composition obtained by mixing and reacting, in advance, a base resin containing 100 parts by mass of an acrylic-based resin in a solid content and 0.05 to 5 parts by mass of an isocyanate compound in a solid content.

According to an exemplary aspect, the waterproof structure has a multilayer waterproof structure body having a waterproof layer which is formed on the surface of the substrate and is formed from the resin-coated film, an inorganic material layer formed from mortar or concrete, and an interlayer adhesive layer which is interposed between the waterproof layer and the inorganic material layer to adhere the waterproof layer and the inorganic material layer to each other, in which the interlayer adhesive layer is the curing material of the interlayer adhesive.

A flexible sheet can be interposed and disposed between the substrate and the waterproof layer.

The interlayer adhesive layer can eb the curing material of the interlayer adhesive, and can be interposed between a waterproof layer which is formed on the surface of the substrate and which is formed from a resin-coated film, and an inorganic material layer which uses mortar or concrete and is cured, to adhere the waterproof layer and the inorganic material layer to each other.

According to an exemplary aspect, the waterproof layer and the inorganic material layer can be firmly adhered to each other.

The inorganic material layer can remain strongly adhered to and does not peel away from the waterproof layer over the long term.

When an exemplary embodiment is applied to a precedent waterproof construction method of the subsurface structures, the inorganic material layer formed from concrete or the like can be formed thereon while preventing subsurface water or the like from entering into the subsurface structure.

Further, when an exemplary embodiment is applied to a roof waterproof construction method, an inorganic material layer formed from concrete or the like can be formed on a floor or the like, which is exposed to the outside, while preventing rain water from entering into the structure.

According to an exemplary interlayer adhesive, the waterproof layer and the inorganic material layer can be firmly adhered to each other and problems of water leaks or the like can be suppressed over the long term.

DETAILED DESCRIPTION

An exemplary waterproof construction method of the subsurface structure is described below with reference to exemplary embodiments of the interlayer adhesive.

Figure 1:
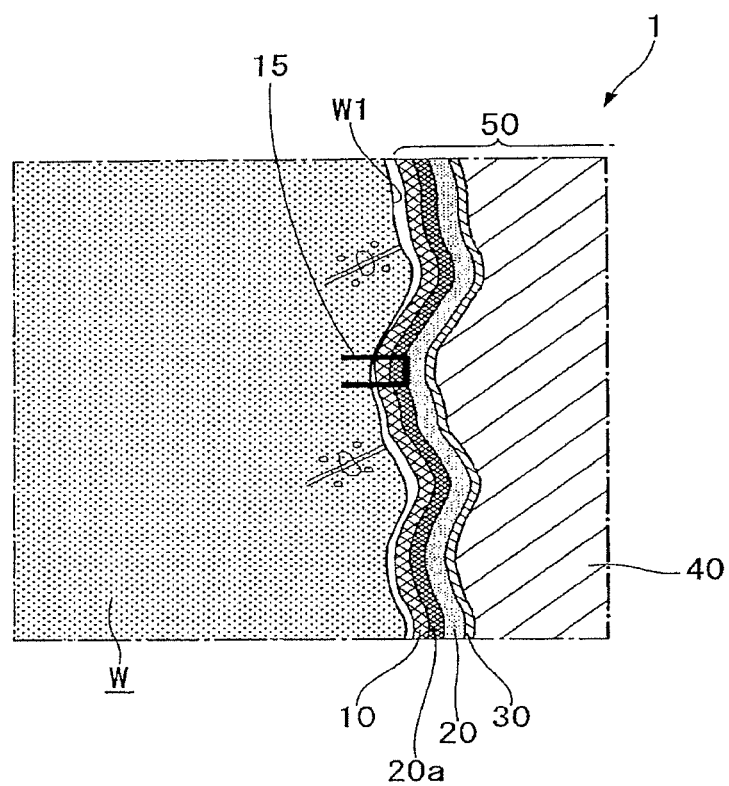
FIG. 1 is a cross sectional view of the wall of subsurface structures waterproofed according to one example of a waterproof construction method according to an exemplary aspect.

FIG. 1 is a cross sectional view of the wall of subsurface structure obtained using an exemplary waterproof construction method of a subsurface structure. FIGS. 2A, 2B, 3A and 3B are drawings showing a step of forming the wall face of the subsurface structure shown in FIG. 1.

FIG. 1 is a drawing showing the cross section of the wall of the subsurface structure. Reference number 1 is a waterproof structure of the subsurface structure which is obtained by an exemplary waterproof construction method using an interlayer adhesive layer 30 according to an exemplary aspect.

In the wall face of the subsurface structure, a multilayer waterproof structure body 50 having a flexible sheet 10 laid down on a surface W1 of a continuous wall W (substrate) serving as an earth retaining wall, a waterproof layer 20 formed on the flexible sheet 10, and an interlayer adhesive layer 30 formed on the surface (the face opposite to the continuous wall W) of the waterproof layer 20 and a concrete layer (inorganic material layer) 40 formed by adhering the interlayer adhesive layer 30 is provided.

Further, reference number 15 represents a tucker for fixing the flexible sheet 10 to the continuous wall W.

Next, an exemplary waterproof construction method for the waterproof structure 1 is described with reference to FIGS. 2A, 2B, 3A and 3B.

An exemplary waterproof construction method progresses to the steps of FIGS. 2A, 2B, 3A and 3B in sequence.

Figure 2A:
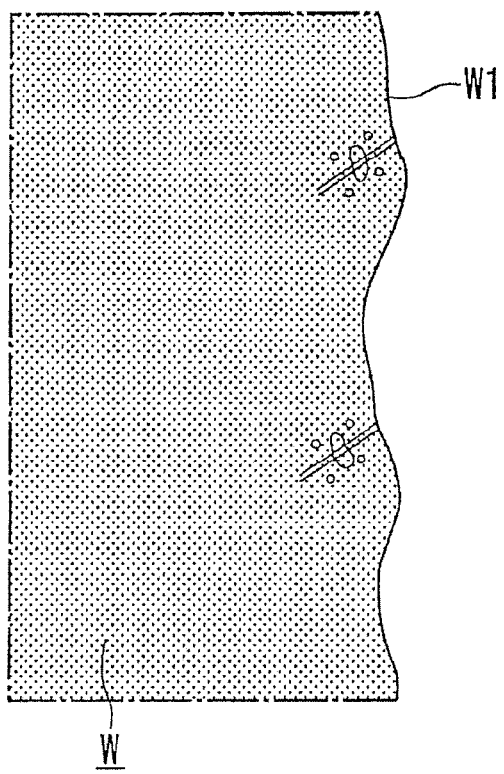
FIG. 2A is a drawing showing a waterproofing step, according to an exemplary aspect.
Figure 2B:
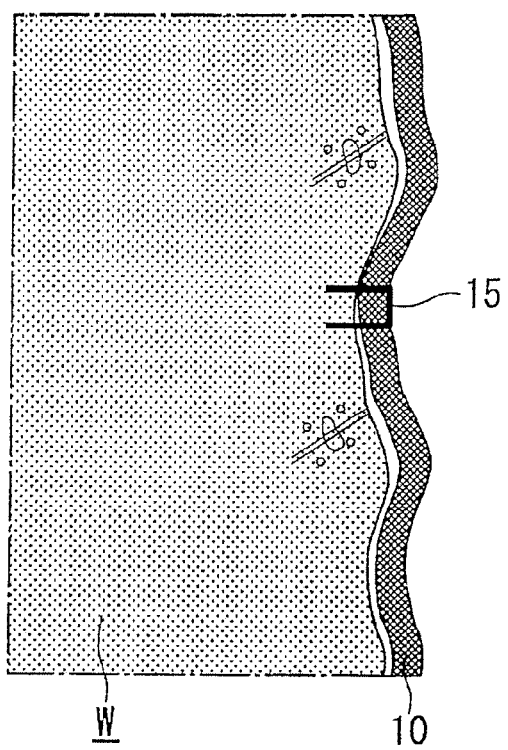
FIG. 2B is a drawing showing a waterproofing step, according to an exemplary aspect.
Figure 3A:
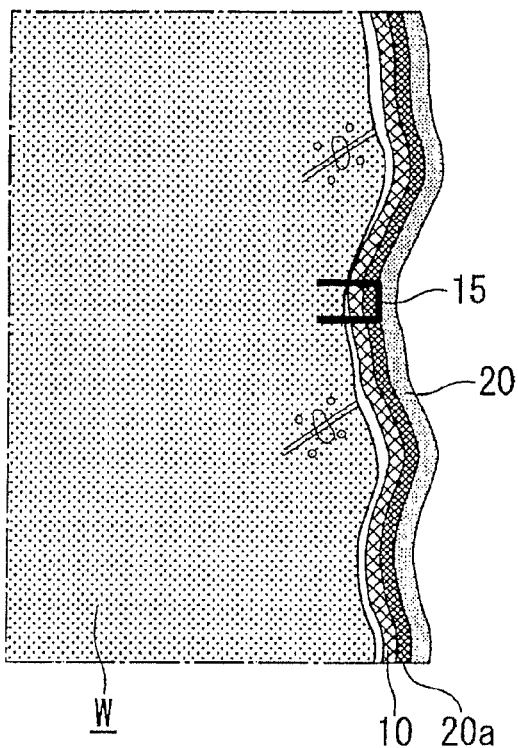
FIG. 3A is a drawing showing a waterproofing step, according to an exemplary aspect.
Figure 3B:
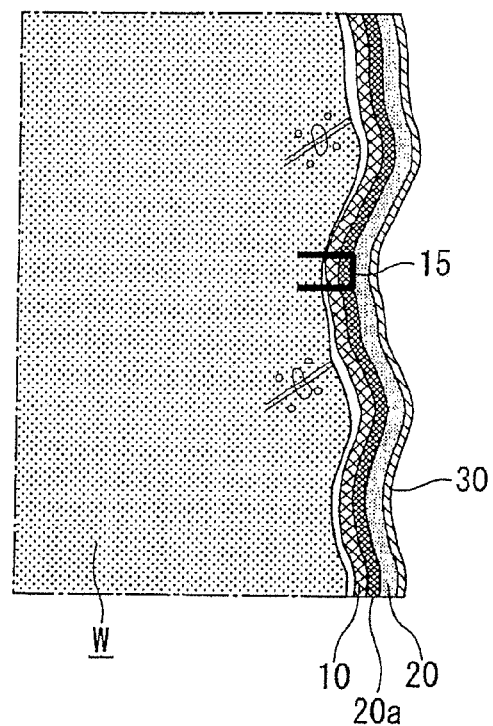
FIG. 3B is a drawing showing a waterproofing step, according to an exemplary aspect.

FIG. 2B represents a sheet laying step which is part of the waterproof layer-forming step. FIG. 3A represents a resin film forming step which is a part of the waterproof layer-forming step, and FIG. 3B represents an adhesive layer-forming step.

As shown in FIG. 2A, the continuous wall W is formed serving as an earth retaining wall by excavation using, for example, an excavation tool or machine. On the surface W1 of the continuous wall W, the waterproof layer 20 is formed by the following waterproof layer-forming step. The waterproof layer-forming step includes a sheet laying step for laying down the flexible sheet 10 on the continuous wall W, and a resin film forming step for forming the waterproof layer 20 on the flexible sheet 10.

Description is made with reference to the sheet laying step.

As shown in FIG. 2B, the flexible sheet 10 is laid down on the surface W1 of the continuous wall W.

In the sheet laying step, the flexible sheet 10 with flexibility is extended and laid down so as to cover the surface of the continuous wall W.

The flexible sheet 10 is fixed to the continuous wall W by a staple tucker 15 as a fixture. The flexible sheet 10 can be laid down (tighten) in a state where tensile force is applied.

Further, the fixture is not specifically limited; and not only a tucker but also a nail with a washer, a roofing nail, a pin or the like can be used.

The flexible sheet 10 is not specifically limited. It is suitable for smoothing the continuous wall W with flexibility, and includes, for example, a synthetic resin film, a synthetic resin sheet, fabric materials (unwoven or woven) or the like, a lamination sheet of fabric materials (unwoven or woven) and a synthetic resin sheet or the like may be used.

For example, from the viewpoint of potent adhesiveness with polyurethane-based resin suitably used in the waterproof layer 20 and excellent waterproofing property, a sheet where fabric materials (non-woven or the like) is laminated on both faces of the synthetic resin film with no-water permeability (water shield) can be used as the flexible sheet 10.

For example, a lamination sheet can be used, where nonwoven fabric formed from polyester, polypropylene, polyethylene or the like is laminated on both faces of a film formed from polyethylene, polypropylene, polyester or the like.

After the sheet laying step, a resin film-forming step is performed.

As shown in FIG. 3A, the waterproof layer 20 is formed on the flexible sheet 10 in the resin film-forming step.

Specifically, for example, thermosetting resins such as polyurethane-based resin, for example, are sprayed and coated using a spray coating device (a two liquid collision mixer) of a two liquid type collision mixing method with a high pressure spray gun, to thereby form a resin-coated film. The formed resin-coated film becomes the waterproof layer 20 by curing.

As a polyurethane-based resin, for example, the waterproof layer 20 can be formed by rapidly reacting a solventless, very rapidly cooling, two liquid type polyurethane-based resin containing a solventless polyisocyanate prepolymer liquid and a solventless polyol liquid (depending on the situation, the solventless polyol liquid may contains solventless polyamine-containing).

Further, the thickness of the formed waterproof layer 20 can be 1 to 3 mm from the viewpoint of waterproofing ability and film-forming cost.

In the waterproof layer 20 as an example shown, a part of spray-coated polyurethane-based resin is impregnated into the flexible sheet 20 to form a waterproof material impregnation layer 20a.

The waterproof layer 20 is integrated by firmly adhering it to the flexible sheet 10.

When a fabric (nonwoven or the like) is used in the flexible sheet 10, the flexible sheet 10 and the waterproof layer 20 can be integrated due to the waterproof material impregnation layer 20a.

Further, the thickness of the waterproof layer 20 refers to the thickness excluding the thickness of the waterproof material impregnation layer 20a.

In the method, the waterproof layer-forming step includes a step of laying down the flexible sheet 10 on the continuous wall W and a step of forming the waterproof layer 20 on the flexible sheet 10. However, the waterproof layer-forming step is not limited thereto, and the sheet-laying step can be omitted and it is possible that only the resin film-forming step is included. In this case, a proper primer may be applied to a portion of the waterproof layer formed on the surface W1 of the continuous wall W, followed by performing the resin film-forming step to form a waterproof layer.

Forming the waterproof layer 20 is not limited to using the polyurethane-based resin, and materials exhibiting excellent waterproofing ability, for example, thermosetting resins such as polyurea-based resins, and acryl urethane-based resins may be used. Further, thermoplastic resins such as polyvinyl chloride-based resins, polyvinylidene chloride-based resins, and acryl-based resins may be used. That is to say, one or more of a polyurethane-based resin, a polyurea-based resin, an acryl urethane-based resin, a polyvinyl chloride-based resin, a polyvinylidene chloride-based resin, and an acryl-based resin can be used in the waterproof layer 20.

In the waterproof layer 20, an FRP (fiber reinforced plastic) may be used, which has a thermosetting resin (including at least one of a polyurethane-based resin, a polyurea-based resin, and an acryl urethane-based resin) or a thermoplastic resin (a polyvinyl chloride-based resin, a polyvinylidene chloride-based resin, and an acryl-based resin) as a base material. Fibers which can be used in the FRP include inorganic fiber such as glass fibers, carbon fibers and metal fibers; and organic fibers such as aramid fibers, polyester fibers, nylon fibers and the like.

In the waterproof layer 20, a polyurethane-based resin, a polyurea-based resin, an acryl urethane-based resin, a polyvinyl chloride-based resin, a polyvinylidene chloride-based resin, an acryl-based resin, an FRP and the like can be used.

Further, in the waterproof layer 20, at least one of a polyurethane-based resin, a polyurea-based resin, an acryl urethane-based resin, a polyvinyl chloride-based resin, a polyvinylidene chloride-based resin, an acryl-based resin and an FRP can be used.

The resin materials to be used in the waterproof layer 20 are not limited to thermosetting resins or thermoplastic resins.

As the construction method for the waterproof layer 20, a method (two-part mix method) is exemplified above, in which two liquids (liquid resin materials of two kinds) are mixed using a spray coating equipment of two-part type collision mixing method with a high pressure spray gun. However, it is not limited thereto, and the waterproof layer 20 may be formed by one liquid method using polyurethane-based resin, a polyurea-based resin or the like.

The construction method may be a hand coating construction and a coating construction using a spray coating device. When the hand coating construction is used, materials having an initial curing time of 5 minutes to 24 hours can be used.

The waterproof layer 20 may be a solid structure with no foam, a foam resin (for example, a two-part type foamed polyurethane-based resin, one-part type foamed polyurethane-based resin) may be formed as the material. As the foam resin, a closed-cell foamed resin can be used from the viewpoint of securing a waterproofing property.

From the viewpoint of small influences of humidity, and easily controlling the curing time, two-part mix type polyurethane-based resin and two-part mix type polyurea-based resin can be used, and can be obtained by mixing a liquid base resin (a liquid resin material) and a liquid curing agent (a liquid resin material) containing an isocyanate component.

The polyisocyanate component is not specifically limited, but includes, for example, a low molecular isocyanate compound such as diphenyl methane-4,4'-diisocyanate (MDI), carbodiimide modified diphenyl methane diisocyanate (liquid MDI), polymethylene polyphenyl isocyanate (crude MDI), 2,4-tolylene diisocyanate (2,4-TDI), 2,6-tolylene diisocyanate (2,6-TDI), xylene diisocyanate (XDI), and hexamethylene diisocyanate. Further, the component includes a prepolymer having an isocyanate group at the end thereof, a burette modified body and the like, which modify the isocyanate compound. Further, these polyisocyanate components may be used singly or in combination of two or more kinds.

Further, when the waterproof layer 20 is formed by using a mixed two-part spray type polyurethane-based resin, the polyisocyanate component can be MDI or liquid MDI, or a modified body thereof, prepolymer having an isocyanate group at the end thereof, and the like.

To the resin may be added additives such as a plasticizer, a curing catalyst, a filler, an antioxidant, a flame retardant, a stabilizer, an ultraviolet absorber, a surfactant, or a coloring pigment, if desired.

As the curing agent, an active hydrogen-containing compound can be used. For example, at least one selected from polyol, polyamine and water can be used, and polyamine alone or a mixture of polyamine and polyol can be used.

The polyol is not specifically limited. It can have two or more of hydroxyl groups, and, for example, includes a general polyol such as polyether polyol, polyester polyol, polytetramethylene glycol; and a flame-retardant polyol such as phosphorus-containing polyol. These polyols may be used singly or in combination of two or more kinds.

The polyamine is not specifically limited. It can include aromatic polyamine, aliphatic polyamine and the like. Specifically, the polyamine includes diethylene toluene diamine, dialkyl-4,4'-methylenedianiline, tetraalkyl-4,4'-methylenedianiline, 4,4'-methylene bis(2-chloroaniline), bismethylthiotoluene diamine, polyoxyalkylene diamine, methaxylylene diamine, ethylenediamine, isophorone diamine or the like. These polyamines may be used singly or in combination of two or more kinds.

Subsequently, as shown in FIG. 3B, the process is moved to a step of forming the interlayer adhesive layer 30.

In the adhesive layer-forming step, the interlayer adhesive is applied to the surface of the waterproof layer 20 and the coated film is dried and cured to thereby form the interlayer adhesive layer 30.

The interlayer adhesive contains a resin composition obtained by reacting (a) a base resin including an emulsion of a main resin containing at least one of an acrylic-based resin, an ethylene-vinyl acetate-based resin, and an epoxy-based resin, with (b) an isocyanate compound having an isocyanate group.

The acrylic-based resin is a generic name of resins or derivatives thereof obtained by polymerizing acrylic acid, methacrylic acid or derivatives thereof, and includes, for example, an acrylic ester polymer and a methacrylic ester.

As the acrylic-based resin, a copolymer containing a hard component monomer producing a hard polymer and a soft component monomer (an internal plasticizing comonomer) producing a soft polymer is exemplary. In addition to the hard component monomer and the soft component monomer, a copolymer containing a functional group-containing monomer is used, and thereby improvement of stability and adhesiveness can be achieved.

Examples of the hard component monomers include methyl methacrylate, ethyl methacrylate, isobutyl methacrylate, hydroxylethyl methacrylate, hydroxyl propyl methacrylate, styrene, acetonitrile and the like.

Examples of the hard component monomers include methyl methacrylate, styrene and acetonitrile.

Examples of the soft component monomers include ethyl acrylate, n-butyl acrylate, s-butyl acrylate, 2-ethyl hexyl acrylate, hydroxylethyl acrylate and the like.

Examples of the soft component monomers include ethyl acrylate, n-butyl acrylate, and 2-ethyl hexyl acrylate.

Examples of the functional group-containing monomers include acrylic acid, methacrylic acid, crotonic acid, itaconic acid, itaconic half-ester, maleic acid, maleic half-ester, anhydrous maleic acid, anhydrous itaconic acid and the like.

Examples of the functional group-containing monomers preferably include acrylic acid, and methacrylic acid.

The ethylene-vinyl acetate-based resin is a copolymer containing ethylene and vinyl acetate. Examples of the ethylene-vinyl acetate-based resin include an ethylene-vinyl acetate copolymer, an ethylene-vinyl acetate-acrylic copolymer, an ethylene-vinyl acetate-long chain vinyl ester copolymer or the like.

The epoxy-based resin is a resin having two or more epoxy groups in one molecule, and examples include a hydrogenated epoxy-based resin, an alicyclic epoxy-based resin, an aliphatic epoxy-based resin or the like.

The acrylic-based resin, ethylene-vinyl acetate-based resin and epoxy-based resin may be used singly, or in combination of two or more kinds.

The main resin can include at least one acrylic-based resin having a functional group with an active hydrogen in the molecule.

Examples of the functional group with active hydrogen includes a hydroxyl group, an amino group, a carboxyl group or the like.

The main resin can include at least one acrylic-based resin with a Tg (glass transition temperature) of −60 to −10° C., for example, −60 to −30° C.

By using an acrylic-based resin with a Tg of −60° C. or more, an interlayer adhesive layer 30 with sufficient strength can be formed. By using an acrylic-based resin with a Tg of −10° C. or less, the adhesion strength in regard to the concrete layer 40 can be increased. Therefore, by using an acrylic-based resin with a Tg in the above range, an interlayer adhesive layer 30 having high adhesion strength and excellent mechanical strength with regard to the concrete layer 40 can be formed.

The emulsion of the main resin refers to a dispersion in which the main resin is dispersed into dispersion mediums such as aqueous dispersion medium (for example, water), a solvent dispersion medium and the like.

The base resin may be an oil-in-water emulsion or a water-in-oil emulsion of the main resin, and the oil-in-water emulsion is exemplary.

For example, oil-in-water emulsion using an acrylic-based resin as the main resin is exemplary.

Due to emulsification of the main resin, the interlayer adhesive is easily applied, and the interlayer adhesive layer 30 can be cured in the subsurface structure for a short time.

The isocyanate compound is not specifically limited. Examples of the isocyanate compound include an aromatic-based isocyanate compound such as diphenyl methane-4,4'-diisocyanate (MDI), polymethylene polyphenyl isocyanate (crude MDI), 2,4-tolylene diisocyanate (2,4-TDI), 2,6-tolylene diisocyanate (2,6-TDI), 1,5-naphthalene diisocyanate (NDI), and paraphenylene diisocyanate (PPDI); an araliphatic-based isocyanate compound such as 1,3- or 1,4-xylylene diisocyanate (XDI); an aliphatic-based isocyanate compound such as hexamethylene diisocyanate (HDI), trimethylenediisocyanate, and tetramethylene diisocyanate; an alicyclic isocyanate compound such as isophorone diisocyanate (IPDI), dicyclohexyl methane diisocyanate (hydrogenated MDI), and hydrogenated xylylene diisocyanate; and dimmer, trimer, carbodiimide modified body, burette modified body, allophanate modified body, adduct modified body, and an isocyanate group end prepolymer, which are obtained by using the isocyanate compound.

Further, a blocked isocyanate compound in which the isocyanate group is masked with a phenol-based compound (phenol, cresol, xylol, p-nitrophenol, alkyl phenol or the like), or an active methylene compound (methyl malonate, ethyl malonate, dimethyl malonate, diethyl malonate, acetyl acetone or the like); water-dispersible or water soluble isocyanate compound, which is obtained by using the isocyanate compound, can be used.

Further, these isocyanate compounds may be used singly or in combination of two or more kinds.

When a water-dispersible or water soluble polyisocyanate compound is used as the isocyanate compound, the compound can be homogeneously mixed with a base resin containing the emulsion, and moreover the strength of the curing material can be increased.

The isocyanate compound may be at least one of a trimer, a burette modified body, an allophanate modified body, and an adduct modified body.

For example, a water-dispersible or water soluble polyisocyanate compound can be used, which contains at least one of a trimer, a burette modified body, an allophanate modified body, and an adduct modified body and a component having a hydrophilic group and a hydrophobic group.

The trimer can be an HDI trimer. The modified body (burette modified body, allophanate modified body, and adduct modified body) can be an HDI modified body.

Examples of the component having a hydrophilic group and a hydrophobic group can include, for example, a surfactant.

Due to use of the trimer or modified body, the safety of the isocyanate compound can be increased.

In the interlayer adhesive, the main resin can be an acrylic-based resin, and the agent be a liquid resin composition obtained by mixing, just before use, of a base resin containing 100 parts by mass of the acrylic-based resin in a solid content and 0.05 to 20 parts by mass of the isocyanate compound in a solid content.

The interlayer adhesive layer 30 can be obtained by spraying or applying a liquid resin compound with a spray coating device (a two liquid collision mixer) of a two-part type collision mixing method or a general spray coating equipment used in outer wall coating or the like.

The formation of the interlayer adhesive layer 30 is not limited to spraying and hand application sing hand tools such as a brush or a roller can be used.

The interlayer adhesive may be a liquid resin composition obtained by mixing and reacting, in advance, a base resin containing acrylic-based resin as the main resin, and containing 100 parts by mass of the acrylic-based resin in a solid content and 0.05 to 5 parts by mass of isocyanate compound in a solid content.

Even when the liquid resin composition obtained by mixing and reacting, in advance, is used, spraying with the spray coating device, which is used in outer wall coating may be used. Of course, hand application with a hand tool such as a brush or a roller may be employed.

To the resin may be added additives such as plasticizer, a curing catalyst, a filler, an antioxidant, a flame retardant, a stabilizer, an ultraviolet absorber, a surfactant, or a coloring pigment, if desired.

On the surface of the interlayer adhesive layer 30 (the face opposite to the waterproof layer 20), the concrete layer 40 is formed, and thereby the multilayer waterproof structure body 50 shown in FIG. 1 is formed.

The concrete layer 40 is formed by casting concrete-containing a slurry material on the surface of the interlayer adhesive layer 30.

Further, the inorganic material used in the invention is not limited to concrete-containing materials, and mortar-containing materials may be used.

According to an exemplary interlayer adhesive, the waterproof layer and the inorganic material layer can be firmly adhered to each other and problems of water leakage or the like can be suppressed over the long term.

Examples are described below, and the examination results on adhesion strength of the waterproof layer 20 and the concrete layer 40 are described with reference to each example.

EXAMPLES

Example 1

On the surface of a flexible flat plate (300 mm×300 mm) adhering an exfoliation paper, two-part mixed polyurethane-based resin (CV spray; manufactured by Daiflex Co., Ltd.) was sprayed using a spray coating device of a two-part type collision mixing method with a high pressure spray gun and was cured for 1 day, to form a waterproof layer (waterproof layer-forming step).

Subsequently, an interlayer adhesive was coated at 0.2 kg/m$^2$ on the surface of the waterproof layer using a brush or a roller and is cured for 14 days to form an interlayer adhesive layer (interlayer adhesive layer-forming step).

Subsequently, on the surface of the interlayer adhesive layer, mortar (usually containing Portland cement and silica sand at a mass ratio of 1 to 3) was cast at a thickness of 40 mm, and cured and hardened for 7 days to form an inorganic material layer (inorganic material layer-forming step).

Finally, a specimen, which is made of a waterproof layer, an interlayer adhesive layer, and an inorganic material layer, was peeled away from a flexible flat plate, and the specimen was used in the following test.

The interlayer adhesive was obtained as follows.
100 parts by mass (in terms of solid content) of an acrylic-based copolymer emulsion (X-109-404E, manufactured by Saiden Chemical Industry Co., Ltd.) having a Tg (calculated value) of −40° C. was obtained by mixing 89 parts by mass of n-butyl acrylate, 9 parts by mass of acetonitrile, 1 part by mass of acrylic acid, and 1 part by mass of methacrylic acid. Then, 0.5 parts by mass of carbon black (Special black100, manufactured by Degussa) as a filler content was added and mixed. Just before being applied to the surface of the waterproof layer, 0.05 parts by mass of a water-dispersible polyisocyanate compound in a solid content (step coater EU-700 curing agent, Asia Industry Co., Ltd.) containing HDI trimer was added thereto and was agitated for 2 to 5 minutes by an agitator and then was used as an interlayer adhesive.

Example 2

The specimen was obtained in a same manner as in Example 1 except that the interlayer adhesive was obtained as follows.
100 parts by mass (in terms of solid content) of acrylic-based copolymer emulsion (X-109-404E, manufactured by Saiden Chemical Industry Co., Ltd.) having a Tg (calculated value) of −40° C. was obtained by mixing 89 parts by mass of n-butyl acrylate, 9 parts by mass of acetonitrile, 1 part by mass of acrylic acid, and 1 part by mass of methacrylic acid. Then, 0.5 parts by mass of carbon black (Special black100, manufactured from Degussa) as a filler content was added and mixed. Just before being applied to the surface of the waterproof layer, 10 parts by mass of a water-dispersible polyisocyanate compound in a solid content (step coater EU-700 curing agent, Asia Industry Co., Ltd.) containing HDI trimer was added thereto, and was agitated for 2 to 5 minutes by an agitator and then was used as an interlayer adhesive.

Example 3

The specimen was obtained in the same manner as in Example 1 except that the interlayer adhesive was obtained as follows.
100 parts by mass (in terms of solid content) of an acrylic-based copolymer emulsion (X-109-404E, manufactured by Saiden Chemical Industry Co., Ltd.) having Tg (calculated value) of −40° C. was obtained by mixing 89 parts by mass of n-butyl acrylate, 9 parts by mass of acetonitrile, 1 part by mass of acrylic acid, and 1 part by mass of methacrylic acid. Then, 0.5 parts by mass of carbon black (Special black100, manufactured from Degussa) as a filler content was added and mixed. Just before being applied to the surface of the waterproof layer, 20 parts by mass of a water-dispersible polyisocyanate compound in a solid content (step coater EU-700 curing agent, Asia Industry Co., Ltd.) containing HDI trimer was added thereto, and was agitated for 2 to 5 minutes by an agitator and then was used as an interlayer adhesive.

Example 4

The specimen was obtained in the same manner as in Example 1 except that the interlayer adhesive was obtained as follows.
100 parts by mass (in terms of solid content) of acrylic-based copolymer emulsion (X-109-404E, manufactured by Saiden Chemical Industry Co., Ltd.) having Tg (calculated value) of −40° C. was obtained by using 89 parts by mass of n-butyl acrylate, 9 parts by mass of acetonitrile, 1 part by mass of acrylic acid, and 1 part by mass of methacrylic acid. Then, 0.5 parts by mass of carbon black (Special black100, manufactured by Degussa) as a filler content was added and mixed. Then, just before being applied to the surface of the waterproof layer, 22 parts by mass of a water-dispersible polyisocyanate compound in a solid content (step coater EU-700 curing agent, Asia Industry Co., Ltd.) which contains HDI trimer, was added to the mixture. After that, it was agitated for 2 to 5 minutes by an agitator and then was used as an interlayer adhesive.

Example 5

The specimen was obtained in a same manner as Example 1 except that the interlayer adhesive was obtained as follows.
100 parts by mass (in terms of solid content) of an acrylic-based copolymer emulsion (X-109-404E, manufactured by Saiden Chemical Industry Co., Ltd.) having a Tg (calculated value) of −40° C. was obtained by mixing 89 parts by mass of n-butyl acrylate, 9 parts by mass of acetonitrile, 1 part by mass of acrylic acid, and 1 part by mass of methacrylic acid. Then, 0.5 parts by mass of carbon black (Special black100, manufactured by Degussa) as a filler content was added and mixed. Just before being applied to the surface of the waterproof layer, 2 parts by mass of a non-water-dispersible polyisocyanate compound in a solid content (polymethylene polyphenyl polyisocyanate) (Cosmonate M200, manufactured from Mitsui Chemicals Polyurethanes, Inc.) was added thereto, and was agitated for 2 to 5 minutes by an agitator and then was used as an interlayer adhesive.

Example 6

The specimen was obtained in a same manner as Example 1 except that the interlayer adhesive was obtained as follows.
100 parts by mass (in terms of solid content) of an acrylic-based copolymer emulsion (X-109-428E, manufactured by Saiden Chemical Industry Co., Ltd.) having a Tg (calculated value) of −59° C. was obtained by mixing 89 parts by mass of 2-ethyl hexyl acrylate, 9 parts by mass of acetonitrile, 1 part by mass of acrylic acid, and 1 part by mass of methacrylic acid. Then, 0.5 parts by mass of carbon black (Special black100, manufactured by Degussa) as a filler content was added and mixed. Just before being applied to the surface of the waterproof layer, 10 parts by mass of a water-dispersible polyisocyanate compound in a solid content (step coater EU-700 curing agent, Asia Industry Co., Ltd.) containing an HDI trimer was added thereto, and was agitated for 2 to 5 minutes by an agitator and then was used as an interlayer adhesive.

Example 7

The specimen was obtained in a same manner as in Example 1 except that the interlayer adhesive was obtained as follows.
100 parts by mass (in terms of solid content) of a core shell type acrylic-based copolymer emulsion (X-209-047-3, Tg (calculated value) of the core part: −10° C.; Tg (calculated value) of the shell part: −40° C.; manufactured by Saiden Chemical Industry Co., Ltd.) prepared by mixing 64 parts by mass of 2-ethyl hexyl acrylate, 30 parts by mass of methyl methacrylate, 4 parts by mass of acetonitrile, 1 part by mass of acrylic acid, and 1 part by mass of methacrylic acid. Then, 0.5 parts by mass of carbon black (Special black100, manufactured by Degussa) as a filler content was added and mixed. Just before being applied to the surface of the waterproof layer, 10 parts by mass of a water-dispersible polyisocyanate compound in a solid content (step coater EU-700 curing agent, Asia Industry Co., Ltd.) containing an HDI trimer was added thereto, and was agitated for 2 to 5 minutes by an agitator and then was used as an interlayer adhesive.

Example 8

The specimen was obtained in the same manner as Example 1 except that the interlayer adhesive was obtained as follows.
50 parts by mass (in terms of solid content) of an acrylic-based copolymer emulsion (X-109-404E, manufactured by Saiden Chemical Industry Co., Ltd.) having a Tg (calculated value) of −40° C., 50 parts by mass (in terms of solid content)

of an acrylic-based copolymer emulsion (X-509-447E, manufactured by Saiden Chemical Industry Co., Ltd.) having a Tg (calculated value) of −15° C. and 0.5 parts by mass of carbon black (Special black100, manufactured by Degussa) as a filler content were mixed. Just before being applied to the surface of the waterproof layer, 10 parts by mass of a water-dispersible polyisocyanate compound in a solid content (step coater EU-700 curing agent, Asia Industry Co., Ltd.) containing an HDI trimer was added thereto, and was agitated for 2 to 5 minutes by an agitator and then was used.

The acrylic-based copolymer emulsion having Tg of −40° C. was obtained by using 89 parts by mass of n-butyl acrylate, 9 parts by mass of acetonitrile, 1 part by mass of acrylic acid, and 1 part by mass of methacrylic acid. The acrylic-based copolymer emulsion having a Tg of −15° C. was obtained by using 33 parts by mass of styrene, 65 parts by mass of 2-ethyl hexyl acrylate, 1 part by mass of acrylic acid, and 1 part by mass of methacrylic acid.

Example 9

The specimen was obtained in a same manner as Example 1 except that the interlayer adhesive was performed as follows.
50 parts by mass (in terms of solid content) of an acrylic-based copolymer emulsion (X-109-404E, manufactured by Saiden Chemical Industry Co., Ltd.) having a Tg (calculated value) of −40° C. prepared by adding 89 parts by mass of n-butyl acrylate, 9 parts by mass of acetonitrile, 1 part by mass of acrylic acid, 1 part by mass of methacrylic acid, 50 parts by mass (in terms of solid content) of an ethylene-vinyl acetate copolymer emulsion (polysol P-38EN, manufactured by Showa Highpolymer Co., Ltd.) and 0.5 parts by mass of carbon black (Special black100, manufactured by Degussa) as a filler content were mixed. Just before being applied to the surface of the waterproof layer, 10 parts by mass of a water-dispersible polyisocyanate compound in a solid content (step coater EU-700 curing agent, Asia Industry Co., Ltd.) containing an HDI trimer was added thereto, and was agitated for 2 to 5 minutes by an agitator and then was used as an interlayer adhesive.

Example 10

The specimen was obtained in a same manner as Example 1 except that the interlayer adhesive was obtained as follows.
50 parts by mass (in terms of solid content) of an acrylic-based copolymer emulsion (X-109-404E, manufactured by Saiden Chemical Industry Co., Ltd.) having a Tg (calculated value) of −40° C. was obtained by mixing 89 parts by mass of n-butyl acrylate, 9 parts by mass of acetonitrile, 1 part by mass of acrylic acid, and 1 part by mass of methacrylic acid. Then, 50 parts by mass (in terms of solid content) of an epoxy resin emulsion (Doubletex A, manufactured by Daiflex Co., Ltd.) and 0.5 parts by mass of carbon black (Special black100, manufactured by Degussa) as a filler content were added and mixed. Just before being applied to the surface of the waterproof layer, 10 parts by mass of a water-dispersible polyisocyanate compound in a solid content (step coater EU-700 curing agent, Asia Industry Co., Ltd.) containing an HDI trimer was added thereto, and was agitated for 2 to 5 minutes by an agitator and then was used as an interlayer adhesive.

Example 11

The specimen was obtained in a same manner as Example 1 except that the interlayer adhesive was obtained as follows.
100 parts by mass (in terms of solid content) of an acrylic-based copolymer emulsion (X-109-404E, manufactured by Saiden Chemical Industry Co., Ltd.) having a Tg (calculated value) of −40° C. was obtained by mixing 89 parts by mass of n-butyl acrylate, 9 parts by mass of acetonitrile, 1 part by mass of acrylic acid, and 1 part by mass of methacrylic acid. Then, 0.5 parts by mass of carbon black (Special black100, manufactured by Degussa) as a filler content was added and mixed. After adding 0.05 parts by mass of a water-dispersible polyisocyanate compound in a solid content (step coater EU-700 curing agent, Asia Industry Co., Ltd.) containing an HDI trimer, the resultant is treated for 4 hours at 60° C. while being mixed by an agitator with the reaction finished in advance and it was used as an interlayer adhesive.

Example 12

The specimen was obtained in a same manner as Example 1 except that the interlayer adhesive was obtained as follows.
100 parts by mass (in terms of solid content) of an acrylic-based copolymer emulsion (X-109-404E, manufactured by Saiden Chemical Industry Co., Ltd.) having a Tg (calculated value) of −40° C. was obtained by mixing 89 parts by mass of n-butyl acrylate, 9 parts by mass of acetonitrile, 1 part by mass of acrylic acid, and 1 part by mass of methacrylic acid. Then, 0.5 parts by mass of carbon black (Special black100, manufactured by Degussa) as a filler content was added and mixed. After adding 1 parts by mass of a water-dispersible polyisocyanate compound in a solid content (step coater EU-700 curing agent, Asia Industry Co., Ltd.) containing HDI trimer, the resultant is treated for 4 hours at 60° C. while being mixed by an agitator with the reaction finished in advance and was used as an interlayer adhesive.

Example 13

The specimen was obtained in a same manner as Example 1 except that the interlayer adhesive was obtained as follows.
100 parts by mass (in terms of solid content) of an acrylic-based copolymer emulsion (X-109-404E, manufactured from Saiden Chemical Industry Co., Ltd.) having a Tg (calculated value) of −40° C. was obtained by mixing 89 parts by mass of n-butyl acrylate, 9 parts by mass of acetonitrile, 1 part by mass of acrylic acid, and 1 part by mass of methacrylic acid. Then, 0.5 parts by mass of carbon black (Special black100, manufactured by Degussa) as a filler content was added and mixed. After adding 1 parts by mass of a water-dispersible polyisocyanate compound in a solid content (step coater EU-700 curing agent, Asia Industry Co., Ltd.) containing an HDI trimer was mixed, the resultant is mixed by an agitator at room temperature for 2 hours and left to stand for 7 days and then was used as an interlayer adhesive.

Example 14

The specimen was obtained in the same manner as Example 1 except that the interlayer adhesive was obtained as follows.
100 parts by mass (in terms of solid content) of acrylic-based copolymer emulsion (X-109-404E, manufactured by Saiden Chemical Industry Co., Ltd.) having a Tg (calculated value) of −40° C. was obtained by mixing 89 parts by mass of n-butyl acrylate, 9 parts by mass of acetonitrile, 1 part by mass of acrylic acid, and 1 part by mass of methacrylic acid. Then, 0.5 parts by mass of carbon black (Special black100, manufactured by Degussa) as a filler content was added and mixed. After adding 5 parts by mass of a water-dispersible polyisocyanate compound in a solid content (step coater EU-700 curing agent, Asia Industry Co., Ltd.) containing an HDI trimer was mixed, the resultant was treated for 4 hours at 60° C. while being mixed by an agitator with the reaction finished in advance and was used as an interlayer adhesive.

Example 15

The specimen was obtained in the same manner as Example 1 except that the interlayer adhesive was obtained as follows.
100 parts by mass (in terms of solid content) of an acrylic-based copolymer emulsion (X-109-404E, manufactured by Saiden Chemical Industry Co., Ltd.) having a Tg (calculated value) of −40° C. was obtained by mixing 89 parts by mass of n-butyl acrylate, 9 parts by mass of acetonitrile, 1 part by mass of acrylic acid, and 1 part by mass of methacrylic acid. Then, 0.5 parts by mass of carbon black (Special black100, manufactured by Degussa) as a filler content was added and mixed. After that, 10 parts by mass of a water-dispersible polyisocyanate compound in a solid content (step coater EU-700 curing agent, Asia Industry Co., Ltd.) containing an HDI trimer was mixed, and the resultant is treated for 4 hours at 60° C. while being mixed by an agitator with the reaction finished in advance and was used as an interlayer adhesive.

Example 16

A polyvinyl chloride-based resin sheet (Sikaplan WP1120-20HL; manufactured by SIKA Technology AG) was mounted on a slate plate. Then, an interlayer adhesive was coated at 0.2 kg/m² on the surface of the sheet, and the interlayer adhesive was cured for 14 days to form an interlayer adhesive layer. Subsequently, on the surface of the interlayer adhesive layer, mortar was cast at a thickness of 40 mm, and cured and hardened for 7 days to form an inorganic material layer. Finally, a specimen, which is made of a waterproof layer, an interlayer adhesive layer, and an inorganic material layer was used in the following test.

Example 17

The specimen was obtained in the same manner as in Example 16 except that the interlayer adhesive as shown in Example 3 was used.

Example 18

A polyvinyl chloride-based resin sheet (Sikaplan WP1120-20HL, produced by SIKA Technology AG) was mounted on a slate plate. Then, an urethane-based primer ((EB Primer; manufactured by Daiflex Co., Ltd.) was coated at 01. to 0.2 kg/m² on a surface of the sheet, and the urethane-based primer was cured for a period of time. Subsequently, the interlayer adhesive as shown in Example 1 was coated at 0.2 kg/m² on the surface of the sheet, and the interlayer adhesive is cured for 14 days to form an interlayer adhesive layer.
Subsequently, on the surface of the interlayer adhesive layer, mortar was cast at a thickness of 40 mm, and cured and hardened for 7 days to form an inorganic material layer. Finally, a specimen, which is made of a waterproof layer, an interlayer adhesive layer, and an inorganic material layer was used in the following test.

Example 19

The specimen was obtained in the same manner as in Example 18 except that the interlayer adhesive as shown in Example 3 was used.

Comparative Example 1

A specimen was manufactured without forming an interlayer adhesive as follows.
A waterproof layer was formed in a same manner as Example 1.
Then, an inorganic material layer was formed on the surface of the waterproof layer in the same manner as Example 1.
Finally, a specimen having the waterproof layer and the inorganic material layer was peeled away from a flexible flat plate adhered onto a sheet of exfoliation paper, and was provided for the following test.

Comparative Example 2

A specimen was obtained in a same manner as Example 1 except that the interlayer adhesive was obtained as follows.
210 parts by mass of water was further mixed with the two-part reaction curing type aqueous epoxy resin cement mortar where 100 parts by mass of epoxy resin emulsion (Doubletex A, manufactured by Daiflex Co., Ltd.), 100 parts by mass of a polyamide resin emulsion (Doubletex B, manufactured by Daiflex Co., Ltd.), 500 parts by mass of cement•silica sand mixed powder were mixed, and resultant was used as an interlayer adhesive. The amount to be coated was 0.3 kg/m².

Comparative Example 3

A specimen was obtained in a same manner as Example 1 except that a solvent type liquid butyl rubber adhesive (manufactured from Hokut) was used as an interlayer adhesive.

Comparative Example 4

A specimen was obtained in the same manner as Example 1 except that an adhesive was used where 100 parts by mass of a butyl-based rubber (SR6000, manufactured by Saitama Rubber Corporation) was dissolved into 100 parts by mass of toluene, as an interlayer adhesive.

Figure 4:
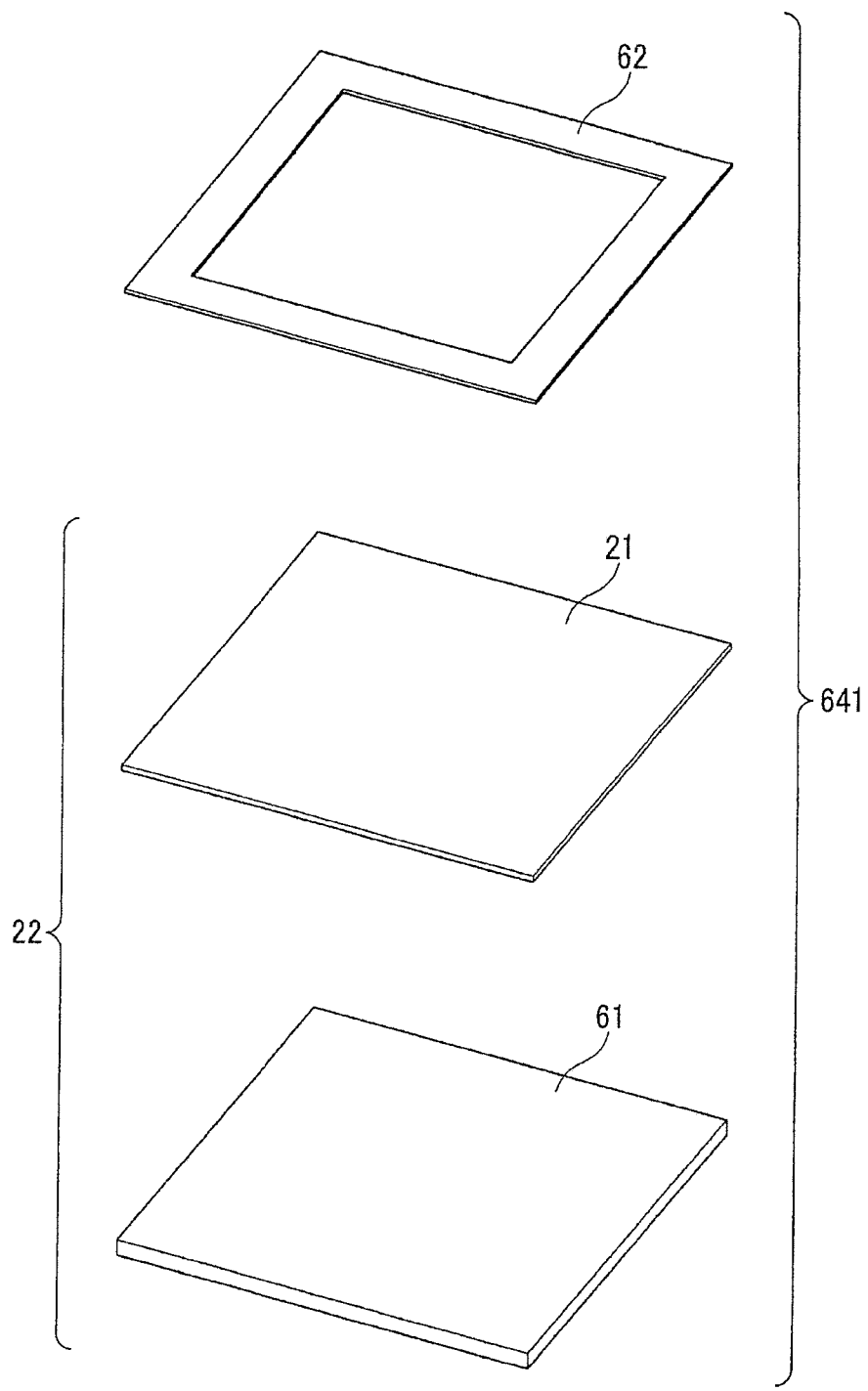
FIG. 4 is an exploded perspective view showing a base plate (waterproof layer-adhered base plate) of formwork for manufacturing a specimen used in a water-tightness test, according to an exemplary aspect.
Figure 5A:
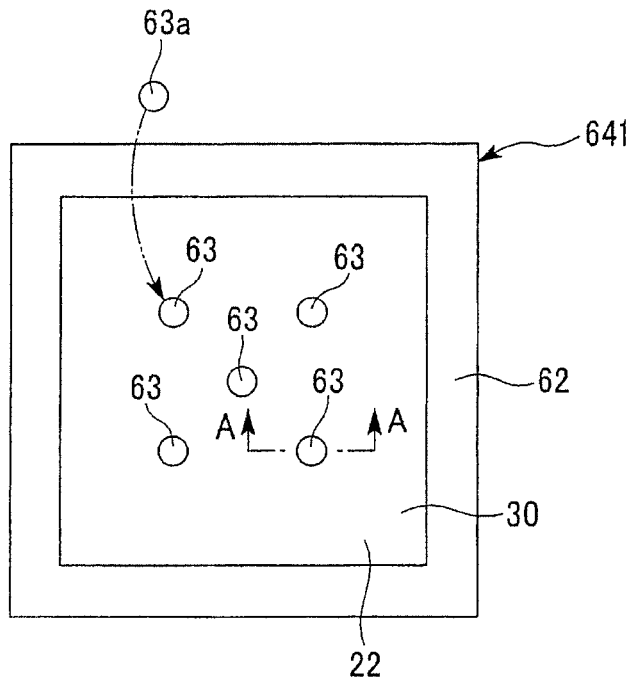
FIG. 5A is a plan view of a waterproof layer-adhered base plate of FIG. 4, according to an exemplary aspect.
Figure 5B:
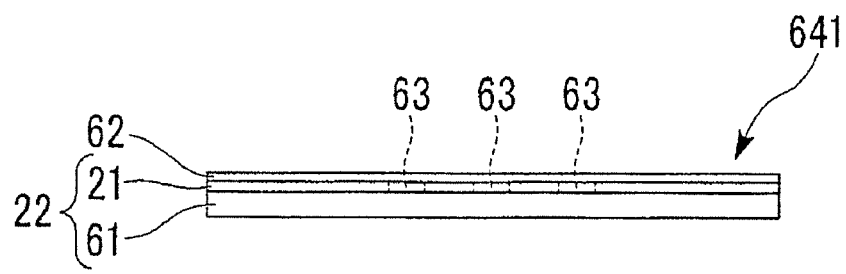
FIG. 5B is a front view of a waterproof layer-adhered base plate of FIG. 4, according to an exemplary aspect.
Figure 5C:
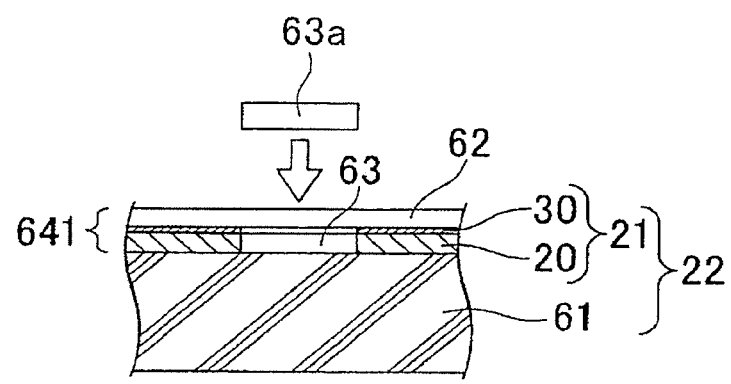
FIG. 5C is a drawing of explaining a waterproof layer-adhered base plate of FIG. 4, and is a cross sectional arrow view along line A-A of FIG. 5A, according to an exemplary aspect.
Figure 6:
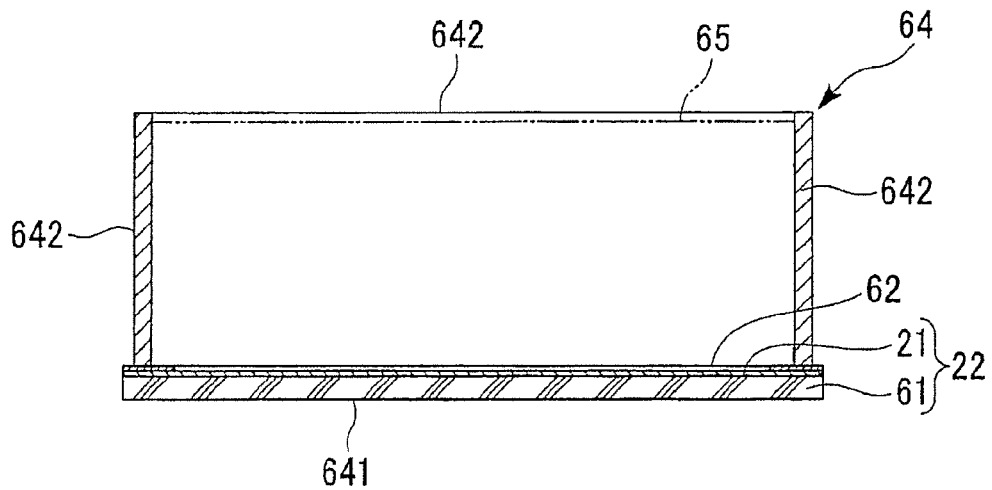
FIG. 6 is a front cross sectional view showing a formwork assembled by providing four sheets of side plates on the waterproof layer-adhered base plate of FIG. 4, according to an exemplary aspect.

A water-tightness test and adhesion strength test performed on the specimen are described below.
FIG. 4 is an exploded perspective view showing a base plate (waterproof layer-adhered base plate 641) of formwork 64 (see FIG. 6) for casting concrete for manufacturing a specimen. FIGS. 5A to 5C are diagrams for explaining the structure of the waterproof layer-adhered base plate 641, FIG. 5A is a plain view of explaining the waterproof layer-adhered base plate 641, and FIG. 5B is a front view of water layer-adhered base plate 641, and FIG. 5C is a cross-sectional arrow view along line A-A of FIG. 5A. FIG. 6 is a front cross sectional view showing a formwork 64 assembled by providing four sheets of side plates 642 on the waterproof layer-adhered base plate 641 with a square frame.
The waterproof layer-adhered base plate 641 is obtained by attaching the frame shaped water permeable material 62 (see FIG. 4, FIG. 5A) to a lamination body 22, where the waterproof layer sheet 21 and the base plate material 61 are laminated, with a double sided pressure-sensitive tape.

As shown in FIGS. 5A to 5C, the waterproof layer sheet 21 includes the waterproof layer 20 and the interlayer adhesive layer 30 formed on one face of the waterproof layer 20. The base plate material 61 is provided on the other face of the waterproof layer 20.

The frame shaped water permeable material 62 is formed such that water permeable sheet (specifically drawing paper having thickness of 204.8 g/m$^2$) is cut out in a square frame shape, and was provided on the opposite side with respect to the base plate material 61 of the waterproof layer sheet 21.

The specimens of each of the Examples and Comparative Examples are used as the lamination body 22.

The frame shaped water permeable material 62 was adhered to the periphery of the waterproof layer 20 using a double sided pressure-sensitive tape, as well as the waterproof layer sheet 21 formed with penetration hole 63 (see FIGS. 5A to 5C) of φ12 mm at the five portions of the center thereof using tools such as a punch.

The frame shaped water permeable material 62 had the same periphery as the waterproof sheet 21, and was formed into a tetragonal frame (square frame) having one side of inner periphery of 150 mm, and was adhered to the waterproof layer sheet 21 such that the four sides of periphery thereof are aligned to those of the waterproof layer sheet 21.

Then, a disk spacer (spacer for penetration hole 63a) having the same inner diameter as the penetration hole 63 is fitted into the penetration hole 63 to clog the penetration hole 63 (see FIGS. 5A and 5C), as well as four side plates 642 in a tetragonal frame shape were disposed on a frame shaped water permeable material 62 to assemble framework 64, and concrete 65 (see FIG. 6) was cast into the framework 64 (inorganic material layer-forming step). As well as curing and releasing, the lower plate material 61 and the spacer for a penetration hole 63a are removed and a block-shaped specimen was obtained.

The specimen is formed from the frame shaped water permeable material 62 and the waterproof layer sheet 21 being adhered to the concrete 65 which is obtained by being cast into the framework 64. The concrete 65 (inorganic material layer) which is obtained by being cast into the framework 64 is a block-shape having a size of 200 mm×200 mm×80 mm. The frame shaped water permeable material 62 and the waterproof layer sheet 21 were adhered to a surface of 200 mm×200 mm of the concrete 65.

After casting, the concrete 65 was cured at room temperature (23° C.) for 7 days while maintaining a wet state where the surface of the concrete 65 is covered with a waste cloth wetted in water and the concrete 65 was released, and then further cured at room temperature (23° C.) for 21 days in the air, and the total curing period of 28 days (period until performing water-tightness property testing, construction research institute type adhesion strength testing, and peeling testing to be described) from the casting of the concrete 65 was secured.

Construction research institute type adhesion strength testing and peeling testing were performed by using a waterproof sheet 21 without forming the penetration hole 63.

As shown below, the water-tightness property test was performed with reference to the specimen.

Figure 7:
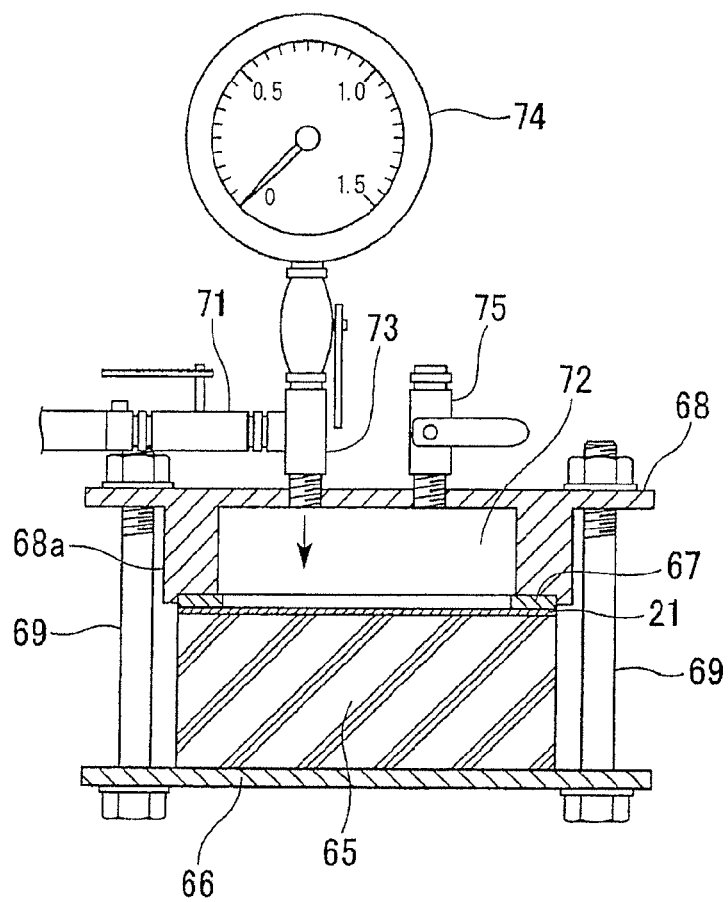
FIG. 7 is a drawing showing a testing apparatus of a water-tightness test, according to an exemplary aspect.

As shown in FIG. 7, the specimen was disposed on the base plate 66 such that the waterproof layer 20 of the specimen faces the upper side. The square frame shaped sealing material 67 (spacer, hereinafter also refer to frame sealing material) was aligned so as to be located on the frame shaped water permeable material 62 and is disposed on the waterproof layer 20. The square frame shaped portion 68a which protruded from one face of square frame upper plate 68, and was larger than the periphery size of the frame shaped sealing material 67, was aligned on the whole circumference of the frame shaped sealing material 67. Then, the upper plate 68 is disposed on the frame shaped sealing material 67 to cover the whole inner space of the frame shaped sealing material 67. After that, the upper plate 68 and the base plate 66 are fastened with a bolt 69, and the specimen was clamped from above and below by the upper plate 68 and the base plate 66.

Then, at this state, water was supplied from a valve 75 to an inner water-filled space 72 surrounded by the waterproof layer 20 (not shown in FIG. 7) of the waterproof sheet 21 of the specimens, the frame shaped sealing material 67 and the upper plate 68, after closing the valve, compressed air was sent through the valve 71 and the pipe line 73 to the water-filled space 72, to thereby act water pressure of 0.5 MPa.

Since the valve 71 is a one-way valve, pressure was maintained in the water-filled space 72. The barometer 74 is equipped in the pipe line 73. In FIG. 7, reference number 75 represents an air vent valve for exhausting air from water-filled space 72.

In order to easily confirm water leak visually with the eyes, as water which is introduced to water-filled space 72, water mixed with fluorescent reagent (specifically, uranine) was used. After maintaining water pressure of 0.5 MPa for 24 hours, the periphery of the frame shaped water permeable material 62 was observed to investigate the presence or absence of a water leak.

When a water leak was not absolutely confirmed, this is defined as "Excellent", and when a water leak is confirmed, this is defined as "Bad". When a water leak occurs but is very small, it is defined as "Inferior" and the results are shown in the "water-tightness property" section of Table 1.

TABLE 1

|  | Example 1 | Example 2 | Example 3 | Example 4 | Example 5 |
|---|---|---|---|---|---|
| Amount of adhesive to be coated (kg/m$^2$) | 0.2 | 0.2 | 0.2 | 0.2 | 0.2 |
| Curing period of adhesive (day) | 14 | 14 | 14 | 14 | 14 |
| 180° peeling adhesion strength (N/25 mm) | 65 | 73 | 45 | 39 | 53 |
| Construction research institute adhesion strength (N/mm$^2$) | 0.6 | 0.9 | 1.2 | 1.4 | 0.6 |
| Water-tightness property (0.5 MPa × 24 hours) | Excellent | Excellent | Excellent | Excellent | Excellent |
| Workability | Good | Good | Good | *1 | Good |
| Odor | None | None | None | None | None |

TABLE 1-continued

|  | Example 6 | Example 7 | Example 8 | Example 9 | Example 10 |
|---|---|---|---|---|---|
| Amount of adhesive to be coated (kg/m$^2$) | 0.2 | 0.2 | 0.2 | 0.2 | 0.2 |
| Curing period of adhesive (day) | 14 | 14 | 14 | 14 | 14 |
| 180° peeling adhesion strength (N/25 mm) | 39 | 42 | 34 | 39 | 31 |
| Construction research institute adhesion strength (N/mm$^2$) | 0.7 | 0.9 | 1.3 | 1.1 | 1.6 |
| Water-tightness property (0.5 MPa × 24 hours) | Excellent | Excellent | Excellent | Excellent | Excellent |
| Workability | Good | Good | Good | Good | Good |
| Odor | None | None | None | None(*2) | None |

|  | Example 11 | Example 12 | Example 13 | Example 14 | Example 15 |
|---|---|---|---|---|---|
| Amount of adhesive to be coated (kg/m$^2$) | 0.2 | 0.2 | 0.2 | 0.2 | 0.2 |
| Curing period of adhesive (day) | 14 | 14 | 14 | 14 | 14 |
| 180° peeling adhesion strength (N/25 mm) | 68 | 72 | 71 | 69 | 67 |
| Construction research institute adhesion strength (N/mm$^2$) | 0.5 | 0.6 | 0.6 | 0.8 | 0.9 |
| Water-tightness property (0.5 MPa × 24 hours) | Excellent | Excellent | Excellent | Excellent | Excellent |
| Workability | Good | Good | Good | Good | *3 |
| Odor | None | None | None | None | None |

|  | Example 16 | Example 17 | Example 18 | Example 19 |
|---|---|---|---|---|
| Amount of adhesive to be coated (kg/m$^2$) | 0.2 | 0.2 | 0.2 | 0.2 |
| Curing period of adhesive (day) | 14 | 14 | 14 | 14 |
| 180° peeling adhesion strength (N/25 mm) | 63 | 51 | 54 | 42 |
| Construction research institute adhesion strength (N/mm$^2$) | 0.6 | 1.0 | 0.5 | 0.9 |
| Water-tightness property (0.5 MPa × 24 hours) | Excellent | Excellent | Excellent | Excellent |
| Workability | Good | Good | Good | Good |
| Odor | None | None | None | None |

|  | Comp. Example 1 | Comp. Example 2 | Comp. Example 3 | Comp. Example 4 |
|---|---|---|---|---|
| Amount of adhesive to be coated (kg/m$^2$) | — | 0.3 | 0.2 | 0.2 |
| Curing period of adhesive (day) | — | 14 | 14 | 14 |
| 180° peeling adhesion strength (N/25 mm) | 1 | 2 | 33 | 19 |
| Construction research institute adhesion strength (N/mm$^2$) | 0.1 | 1.3 | 0.4 | 0.2 |
| Water-tightness property (0.5 MPa × 24 hours) | Bad | Bad | Excellent | Inferior |
| Workability | — | Good | Good | Good |
| Odor | — | None | Solvent odor | Solvent odor |

Bad: Confirmation of water leak
Inferior: confirmation of partial water leak
Excellent: Confirmation of no water leak
*1: slightly high viscosity but no problems in coating
(*2): slight odor of acetic acid
*3: slightly high viscosity but no problems in coating As shown in Table 1, a water leak was confirmed in some Comparative Examples, while a water leak was not confirmed in Examples. When the waterproof layer 20 is peeled away from the specimens, the adhesion strength to the waterproof layer 20 of concrete 65 was determined.

The adhesion strength was determined by two methods, one of them was a construction research institute type adhesion strength test based on a Japan Floor Coating Industry Association Testing Method using a construction research institute type adhesion strength tester and another was a peeling test (180° peeling adhesion strength test) based on JIS K6854.

The results are shown in Table 1. In the Tables, "Construction Research Institute Type Adhesion Strength" represents adhesion strength (N/mm$^2$) determined by Construction Research Institute Type Adhesion Strength test, and "180° peeling adhesion strength" represents adhesion strength (N/25 mm) determined by the peeling test.

Further, workability (work facility) and odor of interlayer adhesive when an interlayer adhesive layer 30 was formed were evaluated.

From Table 1, it has been shown that the adhesion strength is high and it was difficult for peeling to occur in the Examples, compared with the Comparative Examples.

Further, in some Examples (Examples 4 and 15), the viscosity of the interlayer adhesive was increased to slightly reduce the work facility, but the workability was substantially good and there was no odor problem.

Further, there was no problem in terms of water-tightness properties in the Examples.

From these results, it has been known that the adhesion strength of the waterproof layer 20 to the concrete 65 could be increased, and furthermore that a high water-tightness property could be secured in the Examples.

The invention is not limited to the above Examples.

For example, in the above Examples, the waterproof layer 20 was formed by spraying a two-part mixed type polyurethane-based resin, but it is not limited thereto, and the waterproof layer 20 may be formed of a polyurea-based resin.

Further, in the above Examples, the precedent waterproof construction method of a subsurface structure is exemplified and embodiments of the interlayer adhesive are described, but the present disclosure is not limited thereto. For example, exemplary embodiments may be applied to a floor exposed at the outside of the roof of a structure formed by using a roof waterproof construction method.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

EXPLANATION OF REFERENCE NUMERALS 1 subsurface structure
20 waterproof layer
30 interlayer adhesive (interlayer adhesive layer)
40 concrete layer (inorganic material layer)
50 multilayer waterproof structure body
W earth retaining wall

What is claimed is:

1. A structure, comprising: an interlayer adhesive layer and a waterproof layer formed from a resin-coated film, wherein the interlayer adhesive is suitable for adhering the waterproof layer and an inorganic material layer to each other, the interlayer adhesive comprising:
a liquid resin composition obtained by reacting, prior to use, (a) a base resin including an emulsion of a main resin containing an acrylic-based resin, wherein the base resin contains 100 parts by mass of solid content of the acrylic-based resin, with (b) 0.05 to 20 parts by mass of solid content of an isocyanate compound having an isocyanate group wherein the acrylic-based resin has a glass transition temperature of −60 to −10° C.

2. The structure according to claim 1, wherein the acrylic-based resin has a functional group having an active hydrogen in a molecule.

3. The structure according to claim 2, wherein the isocyanate compound is a water-dispersible or water soluble polyisocyanate compound.

4. The structure according to claim 1, wherein the base resin is an oil-in-water emulsion using an acrylic-based resin as the main resin.

5. The structure according to claim 1, wherein the isocyanate compound is a water-dispersible or water soluble polyisocyanate compound.

6. The structure according to claim 5, wherein the water-dispersible or the water soluble polyisocyanate compound includes at least one of an HDI trimer, a burette modified compound, an allophanate modified compound, and an adduct modified compound.

7. The structure according to claim 1, wherein the main resin is an acrylic-based resin, and the interlayer adhesive contains a liquid resin composition which is obtained by mixing and reacting, prior to use, a base resin containing 100 parts by mass of the acrylic-based resin in a solid content and 0.05 to 5 parts by mass of an isocyanate compound in a solid content.

8. The structure according to claim 1, wherein the resin composition is obtained by reacting reactants consisting of (a) the base resin including an emulsion of a main resin containing an acrylic-based resin, and (b) the isocyanate compound having an isocyanate group, wherein a filler is optionally present.

9. A multilayer waterproof structure comprising:
a waterproof layer which is formed on a surface of a substrate, wherein the waterproof layer is formed from a resin-coated film,
an inorganic material layer formed from a mortar or concrete, and
an interlayer adhesive layer which is interposed between the waterproof layer and the inorganic material layer to adhere the waterproof layer and the inorganic material layer to each other,
wherein the interlayer adhesive layer contains a liquid resin composition obtained by reacting, prior to use, (a) a base resin including an emulsion of a main resin containing an acrylic-based resin, wherein the base resin contains 100 parts by mass of solid content of the acrylic-based resin, with (b) 0.05 to 20 parts by mass of solid content of an isocyanate compound having an isocyanate group wherein the acrylic-based resin has a glass transition temperature of −60 to −10° C.

10. The multilayer waterproof structure according to claim 9, wherein a flexible sheet is interposed and disposed between the substrate and the waterproof layer.

11. The multilayer waterproof structure according to claim 9, wherein the resin composition is obtained by reacting reactants consisting of (a) the base resin including an emulsion of a main resin containing an acrylic-based resin, and (b) the isocyanate compound having an isocyanate group, wherein a filler is optionally present.

12. A structure, comprising an interlayer adhesive which is interposed between a waterproof layer formed from a resin-coated film and an inorganic material layer formed from a mortar or concrete, wherein the interlayer adhesive is suitable for adhering the waterproof layer and the inorganic material layer to each other, the interlayer adhesive comprising:

a liquid resin composition obtained by reacting, prior to use, (a) a base resin including an emulsion of a main resin containing an acrylic-based resin, wherein the base resin contains 100 parts by mass of solid content of the acrylic-based resin, with (b) 0.05 to 20 parts by mass of solid content of an isocyanate compound having an isocyanate group wherein the acrylic-based resin has a glass transition temperature of −60 to −10° C.

13. The structure according to claim 12, wherein the resin-coated film contains a thermosetting resin or a thermoplastic resin.

14. The structure according to claim 13, wherein the resin-coated film contains at least one of a polyurethane-based resin, a polyurea-based resin, an acryl urethane-based resin, a polyvinyl chloride-based resin, a polyvinylidene chloride-based resin, an acryl-based resin, and fiber reinforced plastics.

15. The structure according to claim 12, wherein the resin composition is obtained by reacting reactants consisting of (a) the base resin including an emulsion of a main resin containing an acrylic-based resin, and (b) the isocyanate compound having an isocyanate group, wherein a filler is optionally present.

* * * * *